United States Patent
Fix et al.

(10) Patent No.: US 9,779,350 B2
(45) Date of Patent: Oct. 3, 2017

(54) CAPACITIVELY READABLE ENCODED MULTILAYER BODY

(71) Applicants: PolyIC GmbH & Co. KG, Furth (DE); LEONHARD KURZ Stiftung & Co. KG, Furth (DE); OVD Kinegram AG, Zug (CH)

(72) Inventors: Walter Fix, Furth (DE); Manfred Walter, Nuremberg (DE); Wayne Robert Tompkin, Baden (CH); Andreas Schilling, Hagendorn (CH); Klaus Schmidt, Ruckersdorf (DE); Jurgen Metzger, Nuremberg (DE)

(73) Assignees: POLYIC GMBH & CO. KG, Furth (DE); LEONHARD KURZ STIFTUNG & CO. KG, Furth (DE); OVD KINEGRAM AG, Zug (CH)

( * ) Notice: Subject to any disclaimer, the term of this patent is extended or adjusted under 35 U.S.C. 154(b) by 0 days.

(21) Appl. No.: 14/768,893

(22) PCT Filed: Feb. 26, 2014

(86) PCT No.: PCT/EP2014/053689
§ 371 (c)(1),
(2) Date: Aug. 19, 2015

(87) PCT Pub. No.: WO2014/131783
PCT Pub. Date: Sep. 4, 2014

(65) Prior Publication Data
US 2016/0004950 A1     Jan. 7, 2016

(30) Foreign Application Priority Data
Feb. 26, 2013  (DE) .................. 10 2013 101 881

(51) Int. Cl.
*G06K 19/077*     (2006.01)
*B42D 15/08*      (2006.01)
(Continued)

(52) U.S. Cl.
CPC ..... *G06K 19/07754* (2013.01); *B42D 15/085* (2013.01); *B42D 25/355* (2014.10);
(Continued)

(58) Field of Classification Search
CPC ................. G06K 19/07722; G06K 19/07749
(Continued)

(56) References Cited

U.S. PATENT DOCUMENTS

| 5,949,060 | A  | 9/1999  | Schattschneider et al. |
| 8,906,491 | B2 | 12/2014 | Staub et al. |

(Continued)

FOREIGN PATENT DOCUMENTS

| DE | 102005049891 | 4/2007 | |
| DE | WO 2010108692 A2 * | 9/2010 | ............. G06K 3/045 |

(Continued)

*Primary Examiner* — Toan Ly
(74) *Attorney, Agent, or Firm* — Hoffmann & Baron, LLP

(57) ABSTRACT

A multilayer body with a carrier and a layer arranged thereon which comprises electrically conductive material in such an arrangement comprises an information area and a background area (18) which are galvanically separated from each other. In each information area a first zone (10) with electrically conductive material is provided, over the entirety of which electrically conductive material is conductively connected to it. In each background area a plurality of second zones with electrically conductive material is provided, which are galvanically separated from each other. Each first zone (10) preferably occupies a surface area that is at least five times larger than each of the second zones. The electrically conductive material is preferably provided with an average surface coverage which varies over all (Continued)

information areas and background areas (18) by less than 25%. A homogeneous appearance of the multilayer body is thereby ensured, and an item of information provided in the information area, provided by the shape, size and/or alignment of the first zone, is not visible without aids, and therefore cannot be copied.

28 Claims, 9 Drawing Sheets

(51) Int. Cl.
    *G06K 19/067*      (2006.01)
    *B42D 25/355*      (2014.01)

(52) U.S. Cl.
    CPC ..... *G06K 19/067* (2013.01); *G06K 19/07722* (2013.01); *B42D 2033/46* (2013.01)

(58) Field of Classification Search
    USPC .................................................. 235/451, 488
    See application file for complete search history.

(56) References Cited

U.S. PATENT DOCUMENTS

| | | |
|---|---|---|
| 2009/0136721 A1 | 5/2009 | Staub et al. |
| 2012/0146323 A1* | 6/2012 | Schilling .............. G02B 3/0056 283/85 |
| 2012/0193130 A1* | 8/2012 | Fix .......................... G06F 3/047 174/255 |
| 2013/0115878 A1 | 5/2013 | Thiele et al. |
| 2013/0221089 A1* | 8/2013 | Kreutzer .............. G06K 19/067 235/375 |
| 2013/0284578 A1 | 10/2013 | Foerster et al. |

FOREIGN PATENT DOCUMENTS

| | | | |
|---|---|---|---|
| DE | WO 2012038439 A1 * | 3/2012 | ........... G06K 19/067 |
| EP | 0939932 | 5/1998 | |
| EP | 2431923 | 3/2012 | |
| GB | 2462290 | 2/2010 | |
| WO | WO2007036696 | 4/2007 | |
| WO | WO2007045294 | 4/2007 | |
| WO | WO2011154524 | 12/2011 | |
| WO | WO2012038434 | 3/2012 | |

* cited by examiner

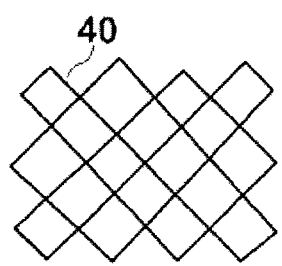
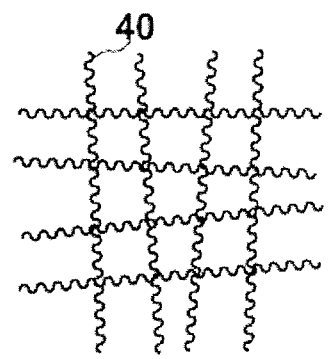
Fig. 2c    Fig. 2d
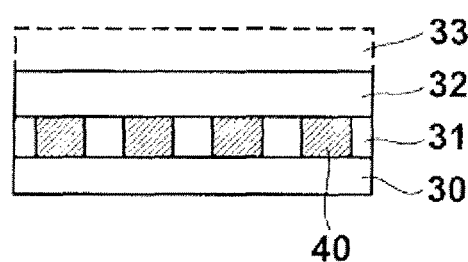
Fig. 2e

CAPACITIVELY READABLE ENCODED MULTILAYER BODY

This application claims priority based on an International Application filed under the Patent Cooperation Treaty, PCT/EP2014/053689, filed on Feb. 26, 2014, and German Application No. DE 102013101881.5, filed on Feb. 26, 2013.

BACKGROUND OF THE INVENTION

The invention relates to a multilayer body as well as a method for producing a multilayer body.

This is in particular a multilayer body in which, by an arrangement of electrically conductive material in a layer on a carrier, an item of information is encoded which is capacitively readable.

The multilayer body can be formed in particular in the form of a transfer film, a laminating film or a security thread. The multilayer body can be applied to or integrated into a plurality of different substrates, in particular banknotes, credit cards, identification documents, passports, tickets, travel and admission tickets, travel documents, product packaging, tags, playing cards etc.

Thus it is known from WO 2011/154524 A1 to provide several electrically conductive areas (so-called coupling surfaces), which are all galvanically coupled to each other via conductive traces in one embodiment example, on a substrate which can comprise paper, but also plastic. The size of the electrically conductive areas is chosen to match measuring fields of a reader. In particular this is a reader with a touch panel functionality. When the substrate with the electrically conductive areas is positioned, there is a capacitive coupling between these electrically conductive areas and the measuring fields. The same effect as when a finger approaches such a measuring field is thereby achieved. Thus the properties of fingertips are simulated by the electrically conductive areas.

It is disclosed in WO 2012/038434 A1 to use such a substrate, with electrically conductive areas located thereon, in a banknote.

Whenever the encoding of an item of information by electrically conductive areas is to serve as a security function, there is the problem that the encoding is not supposed to be directly visible; it is supposed to be able to be read exclusively with the aid of the relevant reader, but not to be recognizable on the basis of a simple observation. As soon as the encoding is visually recognizable, there would, namely, be the danger that it could be easily copied.

For this reason, in the state of the art, a larger surface area of the substrate, which contains the electrically conductive areas, or the whole substrate is covered with an opaque (not transparent) cover layer.

Precisely in the case of security elements and documents, by which a security function is to be provided, however, it is desirable if attention is called visually to the security function. Because of the opaque cover layer there are limitations in a design in this regard.

SUMMARY OF THE INVENTION

The object of the present invention is therefore to demonstrate a way of ensuring, in the case of a corresponding multilayer body without an opaque cover layer, that the encoding is still not visually recognizable.

The object is achieved in a first aspect by a multilayer body with the features according to claim 1, correspondingly by an object, such as for instance a value document or object of value, according to claim 24, a banknote according to claim 25 and a packaging or packaged product according to claim 26 as well as in a second aspect by a method with the features according to claim 27.

The multilayer body according to the invention thus has a carrier (in particular a carrier film) and a layer arranged thereon which comprises electrically conductive material in such an arrangement that at least one information area and at least one background area are provided, wherein the information area and the background area are galvanically separated from each other (in particular even though they are arranged in the same layer, which is or can be the only layer), wherein in each information area a first zone with electrically conductive material is provided, over the entirety of which electrically conductive material is conductively connected to it, and wherein in each background area a plurality of second zones with electrically conductive material is provided, wherein the second zones are galvanically separated from each other.

In the multilayer body according to the invention a neutral background area is thus additionally provided, with the result that the electrically conductive material is not just provided in the at least one information area; the electrically conductive material of the background area can thus serve to distract an observer away from the information area.

It is preferably provided that each first zone occupies a surface area that is at least two, preferably at least five, particularly preferably at least ten, quite particularly preferably at least 30 times larger than each of the second zones. In particular it can be guaranteed by this measure that the neutral background area does not carry any information that is detectable by capacitive reading. However, it can provide an item of optical information, in particular in the form of a decorative element and/or in the form of an optical security feature such as e.g. diffractive or refractive structures.

It is particularly preferably provided that the electrically conductive material is provided with an average surface coverage which varies over the information areas and the background areas by less than 25%, preferably by less than 10%, particularly preferably by less than 5%, wherein the average surface coverage is calculated on partial surfaces which in each case have the same predetermined size, which is 500 µm by 500 µm, 300 µm by 300 µm, 250 µm by 250 µm, 200 µm by 200 µm, 150 µm by 150 µm or 100 µm by 100 µm.

In other words a chosen first partial surface with the dimensions of e.g. 200 µm by 200 µm differs compared with any other partial surface by the named percentage. If, for example, the average surface coverage in the first partial surface is 60%, then there would be a variation by 25% from the 60% in a quarter of the 60%, thus in 15 percentage points. In other words, starting from an average surface coverage in the first partial surface of 60%, in all other partial surfaces the average surface coverage could be between 45% (thus 60% minus 15%) and 75% (thus 60% plus 15%). The average surface coverage as such is independent of the precise microscopic design.

If the named conditions are met, then a homogeneous impression of the multilayer body is brought about by the entirety of each information area with each background area: the resolution limit of the human eye approximately lies at the named dimension of 300 µm. Here a distance of approximately 30 cm between the object to be resolved and the observer's eye is assumed. A difference between different surface coverages is only visible when substantially larger partial surfaces differ from each other in terms of the surface coverage. In one case there is an unchanging transparency, in particular transmissivity, namely the ability to transmit light. In another case (in particular in the case of metallic materials as electrically conductive material) the material reflects the light, wherein under the named conditions homogeneous reflective properties are ensured.

In both cases the homogeneous overall impression guarantees that the information areas cannot be directly visually distinguished from the background areas, with the result that a visual reading of the code is correspondingly also not possible; preferably it is not even recognized that an encoding could be contained at all.

In the first case the touch panel device is preferably translucent or transparent overall, in particular it is to have a degree of transparency of at least 50%, preferably of at least 80%, particularly preferably of at least 90% and quite particularly preferably of at least 95%. This can be made possible by using conductive traces which have a width from the range of from 1 µm to 40 µm, preferably from the range of from 5 µm to 25 µm and in particular are arranged suitably spaced apart from each other in a pattern, with the result that the surface coverage with opaque conductive traces that belongs to the desired transmission sets in. In particular, in each first zone a plurality of such, in particular interconnected, conductive traces are to be formed from the electrically conductive material. In particular, a reliable galvanic coupling of the conductive traces is ensured by the arrangement in patterns. In each background area conductive trace parts which have a width from the range of from 1 µm to 40 µm, preferably from the range of from 5 µm to 25 µm, are preferably correspondingly formed from the conductive material. In order to form the named second zones with a smaller surface area than the first zone in the background area, the individual conductive trace parts are galvanically separated from conductive trace parts of another second zone in the respective background area via a gap with a length which is between 50% and 200% of the width of the conductive trace parts.

If the conductive traces with such a width and in particular such suitable distances are chosen, the individual conductive traces cannot be recognized by the human eye; the effect of providing the conductive traces and conductive trace parts with such parameters is merely that the total degree of transparency is slightly reduced compared with a purely transparent material. The provision of such conductive traces thus provides an electrical functionality without being directly visible. In particular, the short length of the gaps between the individual conductive trace parts also guarantees that the break in them as such also cannot be resolved by a human eye.

In this embodiment it is preferably provided that the conductive traces from each information area have the same first width and the conductive trace parts from each background area have the same second width, wherein the first and second widths only differ from each other by at most 30% of the respectively larger value, preferably they are even identical. This measure particularly simply guarantees that the average surface coverage is also substantially the same. What applies to the width applies similarly to the spacing of the conductive traces. In a regular conductive trace pattern the spacing can be between 50 µm and 300 µm, preferably between 120 µm and 250 µm. With an irregular pattern the average distance lies in this order of magnitude.

Conductive trace parts can be formed particularly well by providing breaks in a regular conductive trace pattern. In each case cruciform structures are thereby provided. In general terms, two conductive trace parts overlap in the second zones in each case.

In order, in a particularly simple manner, that the feature of the galvanic separation of information area and background area is also fulfilled in the case of the implementation of the feature of the only slightly varying average surface coverage, conductive traces of an information area are preferably allocated to one conductive trace part each of a background area, from which they are separated via a gap with a width which lies between half of and ten times the width of the conductive traces.

In terms of achieving a homogeneous reflective action of the multilayer body its average surface coverage with the electrically conductive, in particular metallic, material should if anything be higher. Although a reflective effect is already achieved from an average surface coverage of more than 20%, preferably more than 25%, an average surface coverage of 50% or more is desirable, preferably even a coverage with electrically conductive material over almost the whole surface is provided with only 15%, preferably 10%, particularly preferably 5% free (thus in particular transparent, non-conductive) proportions of surface area.

An arrangement in this regard of electrically conductive material can in particular comprise each second zone being covered with electrically conductive material over the whole surface.

The first zones, which are substantially larger than the second zones, can for their part be covered correspondingly with electrically conductive material over the whole surface. Alternatively, it is possible, for this, that in the first zones in each case several partial areas are covered with electrically conductive material over the whole surface, and are galvanically coupled to each other via bars. Thus the respective partial areas in the first zone can be just as large and have the same shape as the second zones; the only difference then is that the second zones are galvanically completely separated, and that the corresponding closed partial areas in the first zones are coupled to each other via the named bars. In this way an impression with a particular homogeneity is achieved.

In order to delimit the information area from the background area in a manner that is not directly visible, a closed area of a second zone can be separated from a closed area or partial area of a first zone via a gap which is not wider than 150 µm. This gap width can be the width of the spacing of the second zones in the background area and also the width of the spacing of the closed areas in the first zone, not taking into account the bars.

As the conductive traces themselves and the breaks between neighboring conductive traces cannot be resolved by the naked eye without technical aids if the above parameter specifications are adhered to, it is in particular not compulsory for the background area and the information area to be formed according to an identical pattern. In particular it can be provided that two-dimensional, linear and/or punctiform areas without conductive material are formed according to a first pattern in the information area and according to a second pattern different from the first pattern in the background area. Such a first and/or second pattern can in particular be formed by a statistical distribution of small, transparent and non-conductive punctiform areas. The background area and the information area then preferably have, furthermore, substantially identical surface coverages with the electrically conductive material. A homogeneous optical impression is hereby guaranteed.

In a preferred embodiment of the multilayer body in all previously named alternatives a combination with optical security features, in particular visually visible optical security features, is provided, by which attention is called to the security function. For example these optical security features can be optically variable security features, the optical properties of which change depending on the viewing angle and/or the direction of illumination. In the case of decorative applications, for example on packaging, it is desirable if the corresponding product is represented particularly advantageously and/or strikingly by an attractive, in particular visual, design. This also applies in particular to security elements which are used for protecting commercial products against forgery, e.g. in order to particularly highlight the brand name on particular products, for instance pharmaceutical products or cigarettes, by means of the security element. In particular, if the electrically conductive material is formed over the whole surface in the second zones and the first zones or partial areas of the first zones, the electrically conductive material can simultaneously provide a further functionality as a reflective layer for optical security features such as e.g. diffractive or refractive structures or for triple-layer Fabry-Perot thin film elements with color change effect. Thus it is preferably provided that an optical security feature is formed overall in the electrically conductive material in at least one closed area or partial area and preferably several such areas. Thus the electrically conductive material is part of a layer structure (represents a layer) of an optical security feature and/or provides a function of such an optical security feature. The security feature preferably has a microstructure in the form of a linear or crossed sinusoidal or rectangular diffraction grating, a zero-order diffraction structure, a 2D/3D or 3D hologram, a Kinegram®, a Trustseal®, a colored or achromatic blazed grating, an isotropic or anisotropic mat structure, a microlens structure, a macrostructure, a thin film color-change system, e.g. a Fabry-Perot thin film system or the like.

The linear or crossed sinusoidal or rectangular diffraction grating can in particular have a spatial frequency from the range of from 100 lines/millimeter to 3000 lines/millimeter.

In the case of the microstructure it can preferably also be provided that there is a periodicity in which the period is smaller than a wavelength from the wavelength range of visible light.

Such microstructures can in particular be stamped into a varnish layer to which, for its part, the electrically conductive material layer is applied.

A thin film color-change system (such as for instance a Fabry-Perot thin film system) consists of a sequence of several thin, in particular transparent layers, the thickness of which is e.g. in each case half or e.g. a quarter of a wavelength from the wavelength range of visible light, i.e. the so-called $\lambda/2$ or $\lambda/4$ condition is fulfilled. If this is implemented, then these thin film color-change systems have a colored effect, wherein the color changes when the angle of observation is changed.

Thus if the further functionality of the electrically conductive material is provided (for instance as a reflective layer, as represented above), then it is possible for the multilayer body to be recognized as containing a security function, wherein in that case the optically variable device provides a recognizable optically variable effect, e.g. in the form of a particular second item of visual information.

The microstructure can have largely the same structure parameters, such as e.g. structure depth, azimuth angle, relief shape, over its whole area of surface, or these structure parameters or the type of the microstructure can vary over the area of surface of the microstructure and thereby form a motif. The motif can be formed as an individual image or as an endless motif pattern. The motif or the microstructure can be formed registered, i.e. positionally accurate, relative to the areas or partial areas of the electrically conductive material or can form a pattern independently thereof, i.e. not positionally accurate. The positional accuracy between the areas or partial areas of the electrically conductive material and the microstructure usually varies between +/−1 mm in the x- and y-direction and +/−0 mm. The fact that an encoding that cannot be recognized by the human eye without aids is provided by the arrangement of the electrically conductive material is concealed by the optically variable effect. The surface coverage with the electrically conductive material determines the visibility and/or recognizability of the optical security features if the electrically conductive material serves as a reflective layer for optical security features. If the surface coverage is low, the electrically conductive material is also only present in a low surface coverage as a reflective layer for the optical security feature and the corresponding security feature is of comparatively low brilliance or can be recognized in a high- or low-contrast manner. As the surface coverage of the electrically conductive material serving as reflective layer increases, so do the brilliance, the contrast and the recognizability of these optical security features. To increase the visibility of the optical security features, in addition to the electrically conductive layer an additional non-conductive reflective layer, in particular over the whole surface, can be provided, in particular made of non-conductive materials with a high refractive index, so-called HRI materials (HRI=High Refractive Index).

The areas or partial areas of the electrically conductive material can advantageously also interact with other, in particular decorative, layers. For example, additional color layers or effect layers can be provided over and/or under the electrically conductive material such that in combination with the electrically conductive material a characteristic design or a characteristic motif results which, however, largely conceals the actual arrangement of the electrically conductive material as encoding. In particular, the color layers can be formed such that because of a distraction or optical deception generated thereby the specific molding of the electrically conductive material cannot be visually recognized directly. The additional color layers or effect layers can also contain optically variable pigments in a binder, so-called OVI (OVI=Optically Variable Inks). These individual pigments can have, for example, diffractive structures and/or reflective layers and/or Fabry-Perot thin film systems and thereby generate characteristic optical effects. The color layers or effect layers can additionally or alternatively have further contents which, in particular, are machine-readable. For example, these can be magnetic pigments or phosphorescent or luminescent substances.

A microstructure is preferably formed as optical security element with the electrically conductive material as reflective layer, by molding the microstructure into a preferably transparent or transparently colored varnish by means of stamping tools and then coating this microstructure over the whole surface with a thin metal layer, in particular by vapor deposition. By means of known structuring techniques such as laser ablation, etching processes, washing resist processes, mechanical removal or light-exposure processes, the electrically conductive material is then removed in areas of surface, whereby the ultimate surface coverage is defined. Further varnish layers and/or adhesive layers can then be applied to the microstructure, in particular by printing. For example, a heat-sealable adhesive can be applied in order to be able to apply the multilayer body to a substrate by means of hot stamping.

In a particularly preferred embodiment of this design a first item of information is encoded by the position, size, alignment and shape of the first zone (wherein the encoding relates to the shape of measuring fields of a reader device), and a second item of visual information which either corresponds to the first item of information partially or completely or supplements this first item of information to form a total item of information is provided by the optically variable device. In the case of an at least partial correspondence the item of information could be read with the reader and it could thereby be confirmed that the security feature, which is difficult to forge, of the arrangement of the electrically conductive material is actually present in the named code to provide the first item of information, and the read item of information can then also be particularly easily verified as correct. In the case of a supplementing to form a total item of information, this can likewise be the case, in particular if, for example, different graphic motif elements or word elements are provided by the first item of information and by the second item of information, also different related graphic motifs, words or sentence parts. In the same way, the second item of information can also consist of the graphic, non-verbal representation of an object, the name or description of which is then provided by the first item of information, in verbal form. In the same way, the first item of information can specify a source in which the second item of visual information is accessible; thus reference can be made to the page of a book which shows such an image, or for example reference can be made by the first item of information to an internet address (website) where the second item of visual information is reproduced or described by a third item of information.

Optionally, further information carriers such as barcodes or RFID chips can be provided in the multilayer body, with reference to which second or third and fourth items of information which have such a relationship to the first item of information provided by the encoding that the security feature can be verified are provided as an alternative or as a supplement to an optically variable device.

In a preferred embodiment for all previously named aspects of the invention a background area completely surrounds all information areas or at least all first zones. In this way an information area or a first zone is prevented from being located at an edge where it would possibly be easily identifiable. A particularly good protection of the information area is then also ensured by the background area. If the multilayer body is somewhat larger than an input surface of the reader, it can be ensured by a somewhat wider edge area which is formed as background area that the multilayer body only has to be positioned on the input device of the reader arbitrarily, in particular with a high tolerance, and that there is no need to follow a precise instruction. This is also advantageous in the cases in which the reader is positioned on the multilayer body, for example in the case of a larger packaging.

In a preferred embodiment there is precisely one information area. This can have a simple shape, the position and/or alignment of which provides a first item of information. A single information area can, however, also be provided by a complex shape, for instance by formation of an always identical base area away from which several partial areas extend according to an encoding. For example, for the information area, a surface can be provided which comprises three strips (in particular of identical length) arranged one directly under another. The middle strip corresponds to the named base area and is covered in its entirety by the electrically conductive material (in one of the above-specified patterns). The two strip-shaped areas next to the middle strip are divided into a number of partial surfaces (in particular of identical size). An encoding is now carried out in that each of the partial surfaces of the neighboring strip-shaped areas encodes one bit, wherein a coverage of the partial area with electrically conductive material stands for a logical one and a non-coverage with electrically conductive material stands for a logical zero. For example, the sequence of ones and zeros can be easily read by first detecting the coverage or non-coverage of the partial surfaces from left to right in the upper strip-shaped area and then detecting the coverage or non-coverage in the lower strip-shaped area.

An information area can, in a preferred embodiment, also comprise a plurality of first zones which are galvanically coupled to each other by at least one conductive trace. In this case an encoding is provided by the entirety of the first zones, wherein their shape, size, alignment and/or position or also distance from each other can provide the encoding. Through the galvanic coupling of the first zones, an effect as if several fingers were to be positioned simultaneously with their fingertips can be achieved by positioning the multilayer body on the reader. Because of the several zones, the advantage is also achieved that an encoded item of information can be read by the reader in a particularly uncomplicated manner, as the reader only needs to detect the relative positions of the individual zones relative to each other, instead of the absolute position of a predetermined individual zone. In this way it is achieved that an operator does not have to place the multilayer body exactly in a possible target position on the reader and a reliable reading is still guaranteed.

In all named embodiments, as electrically conductive material, at least one material is selected from the group of silver, copper, gold, aluminum, chromium, mixtures and/or alloys of the above-named materials, a conductive paste, polyaniline and polythiophene. Such materials can be applied particularly well and/or structured particularly well. For example, a metal layer can be applied to the carrier or a layer, for example a relief layer or replication layer, in a layer thickness of from 10 nm to 5 µm, preferably 20 nm to 100 nm, and structured. The application can take place by means of vapor deposition, sputter deposition and another application process. A structuring preferably takes place by means of mechanical removal, laser ablation, an etching process or by means of a washing process. Reference is also made to demetallization. Preferably, a printing process can also be used for the structuring. The application and structuring can also take place in a single step, e.g. if an application mask is used.

In a preferred embodiment a transparent or translucent, semi-transparent cover layer is provided on the layer with the electrically conductive material. The electrically conductive material can be protected by the transparent or translucent cover layer and it can still be ensured that the desired effect of the high transparency or highly reflective property remains maintained. This also conditionally applies to a translucent, semi-transparent cover layer.

Up to now, only relative proportions between the first zones and the second zones have been named. The absolute size of the first zones is dependent on how the measuring fields of the reader are set up. With regard to conventional measuring field sizes at the application date, the at least one first zone should have a minimum dimension in one direction of extension of between 2.5 mm and 15 mm. These dimensions are also suitable for a measuring field which can detect when a fingertip is placed on or approaches it. As measuring fields in the future are becoming smaller and smaller, however, it is also not ruled out that in the multilayer body according to the invention the at least one zone has a minimum dimension of between 500 µm and 2.5 mm. As a whole an area of from 0.5 mm to 40 mm makes sense.

The object according to the invention, which is in particular a banknote, a check, an identification document, a travel or admission ticket, an element serving to protect commercial goods or products against forgery, a card (e.g. a card serving the purposes of a game, lottery or advertising) or a packaging (e.g. a storage box for individual parts, a CD case, a box for medical products, a container for liquids, e.g. a wine bottle, a (clothing) tag, a price tag etc.), has a multilayer body according to the invention. In the present case a complete packaging or also a part of a complete packaging is regarded as packaging. In the case of the named value documents or objects of value, it is particularly important that they are protected against forgery, with the result that, because of the achieved, in particular visual, effect of the multilayer body appearing homogeneous, from which it is not seen that an item of information could be encoded by the information areas, it is ensured to a particular degree that the security feature cannot be readily forged. The achievement of a concealing effect on the information areas, i.e. their visual concealment, can also be achieved by a corresponding decorative, in particular graphic, design which does not explicitly have the function of a protection against forgery. Such a correspondingly molded design can effectively visually hide the information areas without impairing the encoded information.

If the object is a value document such as a banknote, the multilayer body is preferably strip-shaped and either applied to a substrate of the banknote (then in particular as a laminate or hot-stamping foil) or embedded in such a substrate (then as a so-called security thread). The multilayer body can also be patch-shaped, i.e. can cover only a part of the banknote substrate in the form of a label or tag or be provided as an element covering the banknote substrate over the whole surface.

If the object is a packaging, the multilayer body is preferably attached or applied to an outside of the packaging. It is likewise conceivable that the multilayer body is applied to a separate or separable constituent of the packaging. Examples are e.g. a card enclosed separately, loose, or a separable flap on the packaging.

The method according to the invention for producing a multilayer body preferably serves to produce a multilayer body of the above-described type according to the invention and comprises the steps of:
providing and/or detecting dimensions of measuring fields of an input device capacitively detecting an approach and/or contact by an input object
providing an information content,
providing a carrier,
applying electrically conductive material to the carrier in such an arrangement that
  a) at least one first information area is provided which in each case has a first zone over the entirety of which electrically conductive material is conductively connected to it, and wherein the position, size, shape and/or alignment of the first zones and/or a distance between several first zones is chosen to match the dimensions of the measuring fields, that the information content is encoded for a (thus with regard to a) reading with the aid of the input device, and that
  b) in the same layer as the at least one information area at least one background area is provided which has a plurality of second zones which are galvanically separated from each other, with the result that when the information content of the first zones is read with the aid of the input device the background area is distinguished from the information area such that the information content of the first zones is detected.

In the method according to the invention a neutral background area is thus additionally provided which does not carry any information that can be detected by capacitive reading. However, it can provide an item of optical information, in particular in the form of a decorative element and/or in the form of an optical security feature such as e.g. diffractive or refractive structures. Because of the provision of a background area the electrically conductive material is not just provided in the at least one information area, and this electrically conductive material of the background area can then serve to distract an observer from the information area, ideally even, as in the preferred embodiment of the multilayer body, to ensure an ultimately homogeneous impression of the multilayer body.

The at least one information area and the background area are preferably formed different from each other such that when read with the aid of the input device the information area is distinguished at least from the background area such that the information content of the first zones is correctly detected with a high degree of probability. For example, the second zones of the background area can also be formed such that they are detected during the reading, but do not substantially impair the detection of the information content of the first zones. For example, the second zones can result in an interfering signal, background signal or a so-called noise during the reading. However, they are formed such that this noise still continues to allow the detection of an information content of the first zones. For this, the second zones can in particular be formed so small in relation to the dimensions of the measuring fields that when the information content of the first zones is read with the aid of the input device the background area is not detected by the input device.

In this way a high level of protection against forgery is guaranteed, because in the first place a forger may not even be able to recognize the fact that an item of information is encoded in the information area; and even if a possible forger knows this, he will not necessarily recognize the encoding as such using the formation of the information area in relation to the background area.

In a preferred embodiment, the electrically conductive material is metal, which is first applied over the whole surface and then removed in areas. A demetallization process such as, for example, mechanical removal, etching processes by means of etch resists, washing mask processes by means of washing resists, laser ablation or light-exposure processes by means of photoresists has proved to be particularly efficient. Metal can also be applied particularly well, e.g. by vapor deposition, and has the advantage that it strongly reflects light. For example, the metal can be applied to a relief structure, in particular molded in a varnish layer, whereby the thin metal layer follows the contour of the relief structure and thereby advantageously increases the visibility of the relief structure as a reflective layer. After the application over the whole surface, the metal layer can be demetallized in areas of surface as described above, i.e. removed in areas of surface.

BRIEF DESCRIPTION OF THE DRAWINGS

Preferred embodiments of the invention are described in more detail below with reference to the drawing, in which FIGS. 2a-2d illustrate a magnification of the section labeled II in FIG. 1, according to different variants, FIG. 2e shows a section through the multilayer body according to FIG. 1.

DETAILED DESCRIPTION OF THE INVENTION

Figure 1:
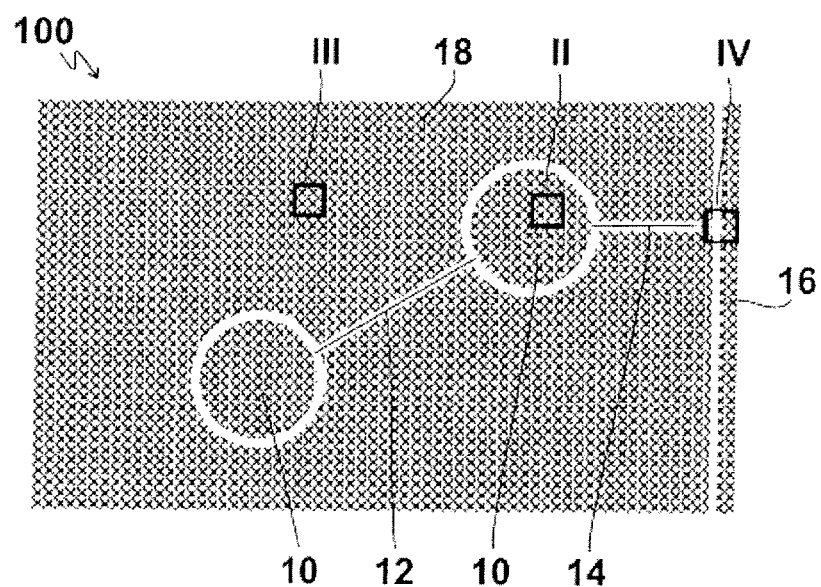
FIG. 1 shows a top view of a multilayer body according to a first embodiment of the invention.

A multilayer body, for instance in the form of a multilayered film, is to carry a capacitively readable item of information, without this item of information becoming apparent. In a first embodiment the item of information is not visible, because the multilayer body has a transparent effect overall. This embodiment is described below with reference to FIGS. 1 to 4b. The first embodiment has the advantage, for example, that a substrate arranged underneath the multilayer body is still visible. This effect can be used advantageously, for example, in banknotes or in the packaging sector, with the result that a decorative surface design of the banknote or packaging is still visible to an observer through the transparent multilayer body. In a second embodiment the item of information is not visible, because the multilayer body as a whole almost completely reflects the incident light. This second embodiment is described below with reference to FIGS. 5 to 8. The structure of both embodiments can be provided in one multilayer body at the same time.

A third embodiment, which adopts an intermediate position between the first and the second embodiment, can also be implemented, but is not described in detail here. In principle the following three cases can thus be distinguished:

a) the case in which the transparency is so high (very low surface coverage with metal) that the multilayer body appears almost invisible;

b) the case in which the transparency is so low and the reflectivity is so high (high surface coverage with metal) that only the multilayer body and not the substrate lying underneath it can be recognized by an observer; and c) the case of semi-transparency, in which the transparency is comparatively low (surface coverage with metal of from approx. 10% to 30%), with the result that the substrate lying underneath it is still easy to see. The latter case is often advantageous if the multilayer body is used in combination with an optical security feature for protection against forgery. In that case the surface coverage with metal is chosen such that the optical security feature appears sufficiently brilliant, because a sufficient metal surface area is available as reflective layer and at the same time the substrate is still visible through the optical security feature.

A multilayer body labeled 100 as a whole according to the first embodiment of the invention illustrated in FIGS. 1 to 4b comprises an information area which comprises two first zones 10 which are circular in the present case and which are connected to each other by a connecting line 12. A connecting line 14 leads to an edge area 16, where an electrical connection of the first zones 10 can take place. For example an operator can hold the multilayer body in the edge area 16 and ground it in this way.

In the information area electrically conductive material is provided which is conductively connected over the whole information area. If the multilayer body 100 is positioned on a touch panel which capacitively detects the approach of an input object (such as for instance a user's finger), then if the size is comparable the first zones 10 act like fingertips of a user's finger. It is advantageous here if the multilayer body 100 is touched in the edge area 16 by an operator and in this way is connected to him in an electrically conductive manner. In this way a capacitive functionality of the first zones 10 is ensured. Because of the position of the first zones 10 on the multilayer body 100, their spacing and optionally their absolute size, in the present case an item of information is encoded which, in cooperation with an active application program (e.g. an applet), is detected and displayed in the reader with the corresponding touch panel. By means of the application program the encoded item of information is detected and a suitable recorded action is performed.

The circular first zones 10 preferably have a diameter of at least 5 mm and at most 15 mm. A diameter of between 7 mm and 10 mm is particularly preferred here. In this way a secure detection can take place. A minimum distance of two zones 10 relative to each other of 4 mm is furthermore preferred. The minimum distance is particularly preferably 6 mm, but quite particularly preferably 8 mm. The minimum distance is calculated as the shortest edge-to-edge connection of two neighboring zones 10. It is furthermore preferred that the supply lines 12 and/or 14 have a maximum conductive trace width, wherein this is then preferably at most 1 mm, but particularly preferably 500 μm. In this way it is ensured that interfering signals potentially triggered by the supply lines 12 and 14 are kept small and do not impair the secure detection of the zones 10.

FIG. 1 shows precisely two zones 10 which are galvanically coupled to the edge area 16 together via the supply lines 12 and 14. This is also a quite particularly preferred embodiment. Preferably, no more than three zones 10 are galvanically connected to each other and to the edge area 16 via supply lines 12 and 14 respectively. In this way a clear spatial distinction of the zones 10 is guaranteed in the resulting detection signal.

The supply line 14 of FIG. 1 runs perpendicular to the direction of extension of the edge area 16, while the supply line 12 runs diagonal or at an angle to the edge area 16. Such supply lines 12 and 14 which run perpendicular or parallel to the direction of extension of the edge area 16 have proved to be particularly preferred.

The information area with the first zones 10 and the connecting lines 12 and 14 as well as the edge area 16 is surrounded by a background area 18 in which there is no continuous electrical conductivity. The role of the background area 18 is likewise to provide electrically conductive material which has the same appearance or the same optical action as electrically conductive material in the first zones 10 and the connecting lines 12 and 14 as well as the edge area 16.

Figure 2A:
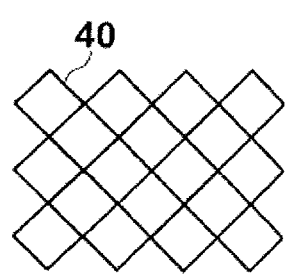
Figure 2B:
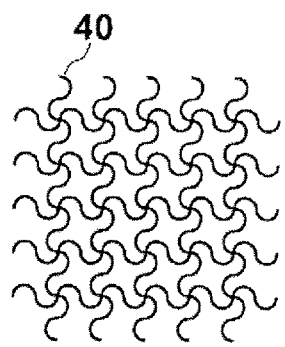
Figure 2F:
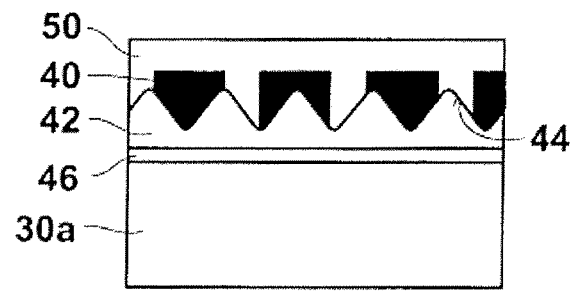
FIG. 2f shows a section through a transfer film to form a variant of the multilayer body according to FIG. 1.
Figure 2G:
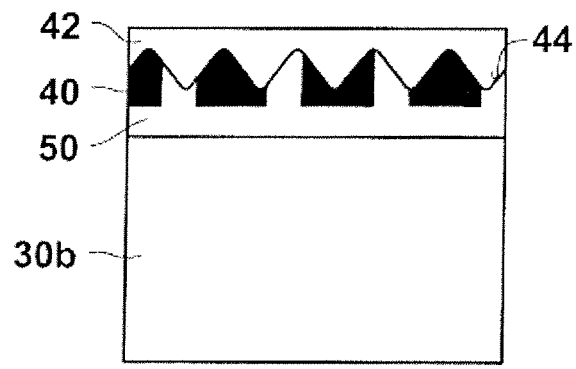
FIG. 2g shows a section through this variant of the multilayer body according to FIG. 1.

The difference between the information area and the background area is explained below with reference to FIGS. 2a to 2g and FIG. 3 as well as FIGS. 4a and 4b:

In order that the multilayer body 100 has a transparent action overall, in the area of the first zones 10 electrically conductive material is provided in the form of conductive traces 40 which are microscopically small, with the result that they cannot be resolved individually by the human eye. The conductive traces 40 have in particular a thickness from the range of from 1 μm to 40 μm, preferably from the range of from 5 μm to 25 μm. FIG. 2a shows a regular pattern of intersecting conductive traces 40. FIG. 2b shows a regular pattern of wavy conductive traces 40. These patterns have the advantage that they are very easy to generate in an almost endless sequence. To prevent diffraction and moiré effects, the connecting lines are, as far as possible, not arranged parallel to each other. Here FIG. 2c shows a variant of the pattern from 2a, in which stochastic deviations in the parameters describing the pattern are provided locally different, with the result that the individual conductive traces 40 do not run parallel to each other. Similarly, the pattern from FIG. 2d is a variant of the pattern from FIG. 2b. Moiré effects can form, for example, because of the superimposition of a uniform grid of the metallic conductive traces of the multilayer body with a likewise uniform halftone on a substrate lying underneath it.

Common to the patterns from FIGS. 2a to 2d is that there is a plurality of crossover points between the individual conductive traces, in order that as uniform as possible a surface conductivity is provided.

As can be seen with reference to FIG. 2e, the electrically conductive traces 40 are in particular applied to a carrier film 30. This is preferably a flexible plastic film, for example of polyethylene terephthalate (PET), polyethylene (PE), polypropylene (PP), polyvinyl chloride (PVC), polystyrene (PS), polyester and/or polycarbonate (PC). This flexible plastic film preferably has layer thicknesses of between 5 μm and 300 μm, particularly preferably of between 23 μm and 100 μm. The carrier film 30 is formed transparent.

The electrically conductive layer 31 provides the conductive traces 40 and preferably consists of a metal, for example copper, aluminum, chromium, silver or gold. This metal layer is preferably applied to the carrier film 30 over the whole surface in a layer thickness of between 10 nm and 5 μm, preferably 20 nm and 100 nm, in particular by vapor deposition, and structured (so-called demetallization). Alternatively the metal layer can also be applied structured to the carrier film 30 in the form of a metallic varnish or a conductive paste, in particular by printing.

An adhesion-promoter layer which improves the adhesion of the electrically conductive layer 31 to the carrier film 30 can also be arranged between the carrier film 30 and the electrically conductive layer 31. Such an adhesion-promoter layer should then likewise be formed from a transparent material, for example from a transparent varnish.

A dielectric layer 32 which has the function of a cover layer is furthermore applied to the first electrically conductive layer 31. The dielectric layer 32 is preferably a transparent varnish which is applied to the electrically conductive layer 31 by means of a printing process in a layer thickness of from 1 μm to 40 μm. Optionally yet a further electrically conductive layer 33 can be applied to the dielectric layer 32. This can be applied by means of printing of an electrically conductive printing material, for example carbon black or conductive silver.

The electrically conductive traces 40 can alternatively be applied to a varnish layer 42. The varnish layer is preferably provided with a relief structure 44, wherein the thin layer of the electrically conductive traces 40 follows this relief structure. Further varnish layers can be applied to the electrically conductive traces 40. The multilayer body can be present in the form of a transfer film which comprises a carrier film 30a, from which a transfer layer 48 can be detached. In order to bring about the detachability, the transfer layer 48 is separated from the transfer film 30a via a detachment layer 46.

In the present example the transfer layer 48 comprises the varnish layer 42 with the relief structure, the electrically conductive traces 40 and an adhesive layer 46 on the electrically conductive traces.

The transfer film can be formed as a hot-stamping foil or cold-stamping foil. To transfer the transfer layer 48 the transfer film is brought with the side of the adhesive layer 50 into contact against or on a substrate 30b. The substrate 30b can consist e.g. of paper (banknote, box or ticket). During the process of the stamping, the transfer layer detaches from the carrier film 30a at least in the area impinged on by raised areas of the stamping tool, because of the presence of the detachment layer 46. Optionally, the adhesive here is activated by heat or ultraviolet radiation, with the result that the transfer layer with the adhesive layer 50 adheres to the substrate 30b.

Figure 3:
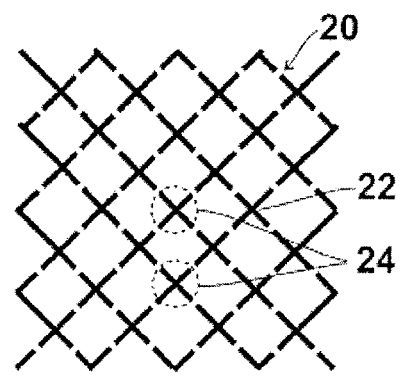
FIG. 3 shows the section labeled III in FIG. 1, magnified in a variant matching the variant according to FIG. 2a, FIG. 4a shows the section labeled IV in FIG. 1, magnified in the variant matching FIG. 2a and FIG. 3.

The electrical conductive traces 40 are to be continuously conductive in the first zones 10, in order that even in the information area all parts of the electrically conductive layer 31 are galvanically connected to each other. It is to be otherwise in the background area 18. The magnified section III from FIG. 1 shown in FIG. 3 shows the situation for the variant with the regular conductive traces according to FIG. 2a. If in section II the conductive traces are provided as shown in FIG. 2a, in section III the corresponding conductive trace pattern is continued, but there are regular breaks (gaps) 20 in the conductive trace pattern, with the result that only conductive trace parts 22 which are cruciform are involved. Therefore only the smallest continuously conductive units which are labeled 24 in FIG. 3 and are called second zones in the following are involved.

The cruciform formation of the conductive trace parts 22 is only an example. The breaks (gaps) 20 can also be formed in any other patterns regularly or irregularly in the conductive traces. For example, the breaks can also be provided at the crossover points of the conductive traces in FIG. 3 (instead of between the crossover points). A separate demetallization pattern can also be superimposed on the conductive trace pattern.

Figure 4A:
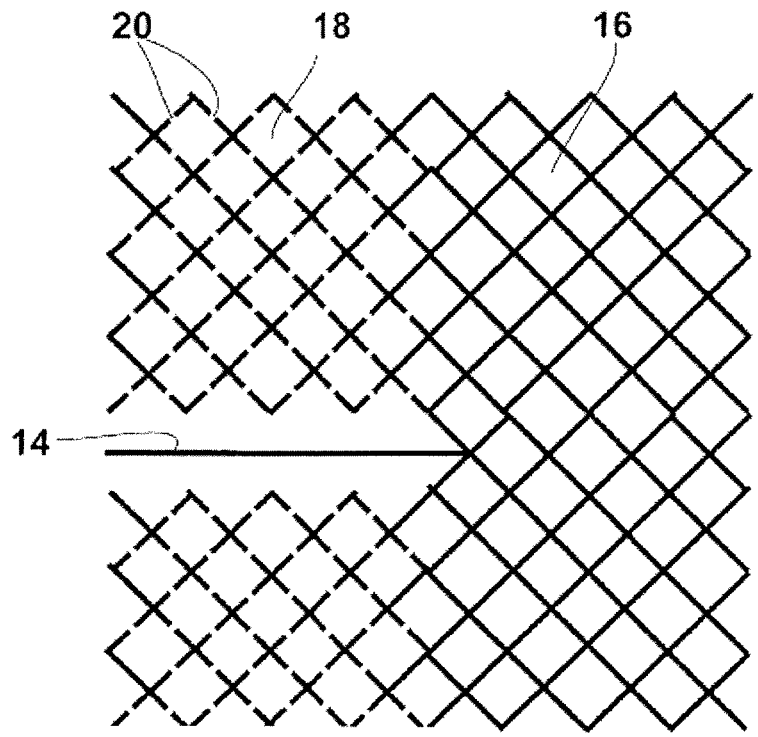
FIG. 4b shows an alternative embodiment of the design according to FIG. 4a, FIG. 5 shows a top view of a multilayer body according to a second embodiment of the invention.

In the transition area between the information area and the background area shown in FIG. 4a (see section IV in FIG. 1), it is recognized that the same pattern of the conductive traces forms the basis both in the information area and in the background area, and the galvanic separation of the individual second zones 24 is only provided by the breaks 20, whereas the entire information area is continuously conductive.

Figure 4B:
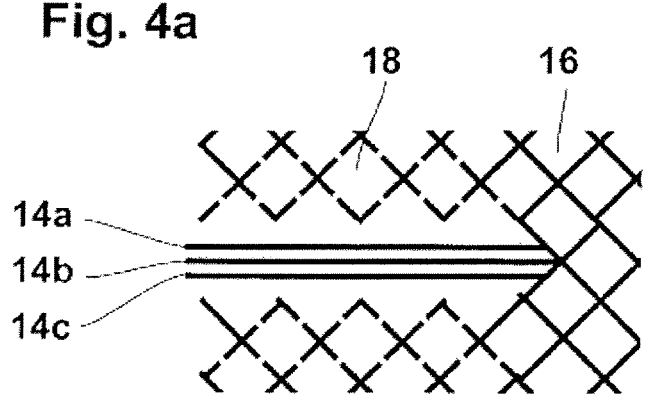

Instead of the individual conductive trace 14, which is shown in FIG. 4a, several conductive traces can also be provided, see the three conductive traces 14a, 14b and 14c shown in FIG. 4b. If one of the conductive traces, e.g. the conductive trace 14b, is damaged and interrupted, then the electrical connection of the edge area 16 is still guaranteed by the remaining two conductive traces, e.g. 14a and 14c, because of redundancy. The conductive traces 14a to 14c are represented only by way of example in respect of their spacing. Their distance from each other can in particular also be substantially greater.

The multilayer body 100 from FIGS. 1 to 4b is transparent overall, because the carrier film 30 and the dielectric layer 32 are transparent, the conductive traces cannot be resolved individually by the human eye and the conductive traces are sufficiently spaced apart from each other, with the result that a low surface coverage with conductive traces is realized. Because the background area 18 essentially almost directly adjoins the information area, separated from the information area only by a small gap with dimensions of at most 150 µm, and is provided by a similar pattern, the transparency (in particular transmissivity) of the entire multilayer body 100 hardly varies over its surface area. If, for example, with a distance between the conductive traces 40 of 40 µm, a surface area of 200 µm by 200 µm is chosen, in order in each case to determine an average surface coverage, then this average surface coverage varies only by at most 25% over the entire multilayer body 100 starting from a base value.

In the second embodiment of the multilayer body the effect is to be achieved that it has a metallic gloss. Here, therefore, metal is provided directly particularly over a large surface area, and in the layer structure according to FIG. 2e, instead of the conductive traces 40, a continuous metal layer made of one of the above-named metals is provided which is only interrupted in areas.

Figure 5:
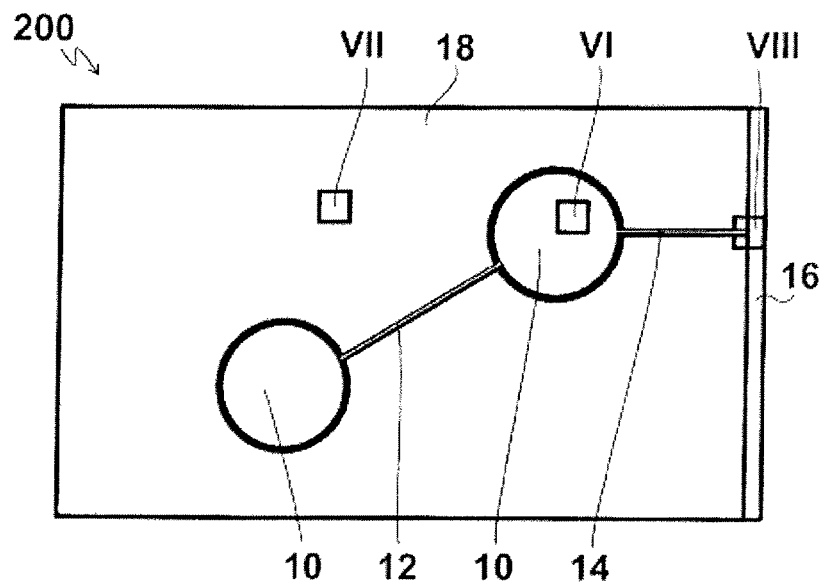

FIG. 5 shows a top view of such a second embodiment of the multilayer body 200 with an identical geometry to that in the multilayer body 100. Here, for reasons of representability, metallized areas are represented with a white surface, and non-metallized areas are represented in black. This inverted representation is also chosen in FIGS. 6a, 6b, 7, 8, 9, 10 and 11a (but not 11b) as well as 12.

Figures 6A, 6B:
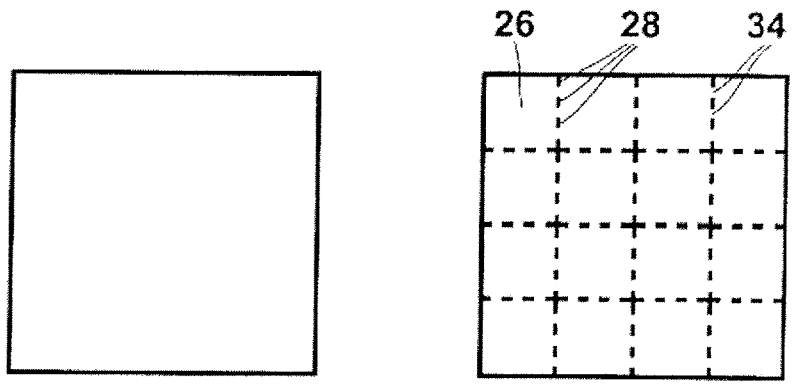
FIG. 6a shows the section labeled VI in FIG. 5, magnified.
FIG. 6b shows the section labeled VI in FIG. 5, magnified, according to a variant.

FIG. 6a shows the formation in an area of a first zone identified by VI in FIG. 5: here metal is provided continuously in the section, which is square in the present case, there are thus no breaks in the first zone. In the variant according to FIG. 6b metal is provided over the whole surface in the first zone 10 in respective partial areas 26, which are square in the present case, in between there is a sequence of breaks 28 with conductive (metallic) bars 34 in between.

Figure 7:
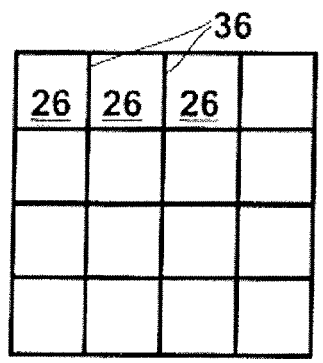
FIG. 7 shows the section labeled VII in FIG. 5, magnified.

In the background area 18 in an area identified by VII in FIG. 5, the pattern shown in FIG. 7 is now provided: there are two zones 26 there which are square and are separated from each other by continuous separations 36.

In this way it is ensured that the areas VI and VII have a similar optical appearance for an observer.

The separations 36 contain in particular a complete break of the metallic layer, which can be brought about for instance by corresponding structuring of the metal layer by means of known structuring processes, e.g. etching processes or washing resist processes or laser ablation or mechanical removal or light-exposure processes. These are gaps which cannot be resolved by the human eye and for example can have a width from the range of from 1 µm to 40 µm, preferably from the range of from 5 µm to 25 µm.

With reference to FIG. 7 the meaning of the embodiment according to FIG. 6b becomes clear: the regular pattern in the background area also continues in a certain respect in the information area, in order that the multilayer body 200 has a uniform effect overall. However, depending on the size of the breaks or gaps 36, the same effect can also be achieved with the variant from FIG. 6a. Again, the surface coverage is a decisive factor here, defined as the surface area covered with metal within a predefinable area of surface of the total surface area A divided by this total surface area A. This surface coverage is substantially the same in the background area and in the information area, in order that the similar optical impression is achieved.

Figure 8:
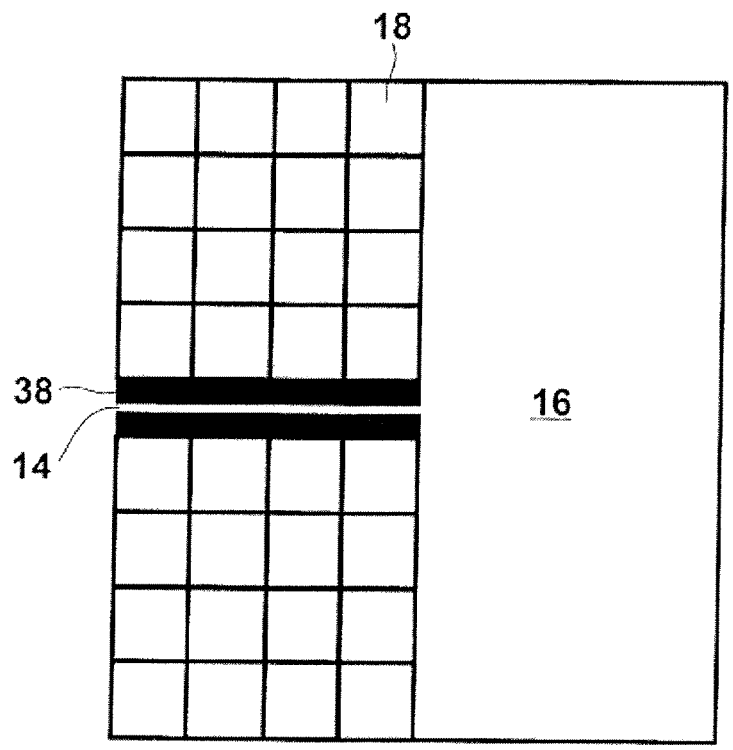
FIG. 8 shows the section labeled VIII in FIG. 5, magnified.

In FIG. 8, matching FIG. 7 and the variant according to FIG. 6a, the section VIII from FIG. 5 is shown magnified. The conductive trace 14 shown in white in the contrast inversion in FIG. 8 connects the contacting area 16 over the whole surface at the edge of the multilayer body 200 to the two first zones 10. Between the conductive trace 14 and the background area 18 there is a gap 38 which has a width of at most 150 µm and is therefore not visible to the human eye.

More complex items of information can be encoded in the multilayer body by the variation in size and pattern of the first zones 10. This becomes clear in the following with reference to the multilayer body 300 from FIG. 9, where, as first zone, a circular zone 10a, a square zone 10b and a triangular zone 10c are to be seen, which are galvanically coupled to each other by connecting lines 12 and are connected to respective conductive edge areas 16a, 16b, 16c by connecting lines 14.

Figure 9:
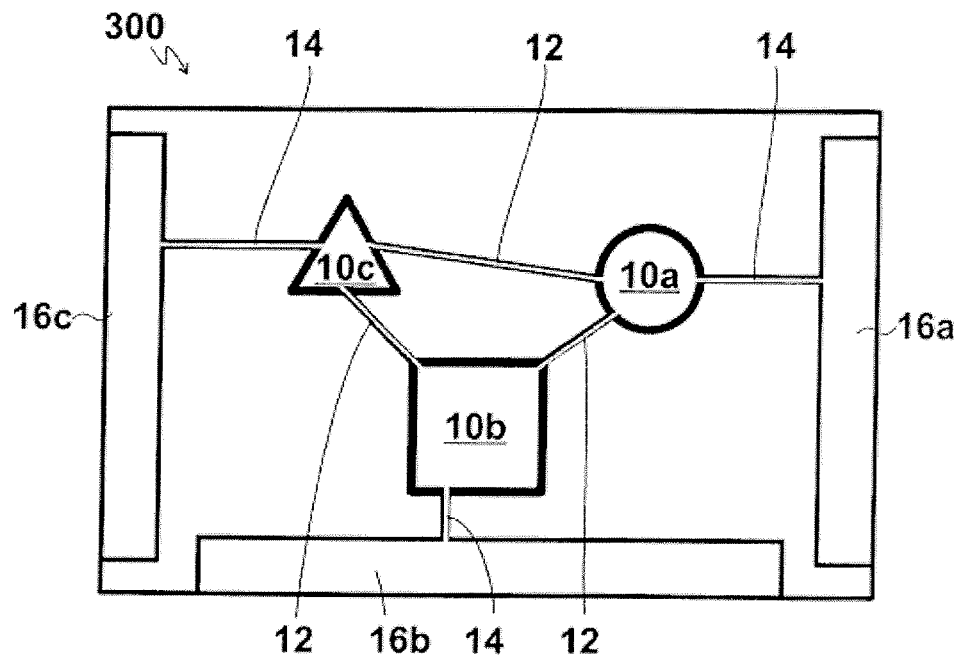
FIG. 9 shows a top view of a multilayer body according to a third embodiment of the invention.

In the embodiment example of FIG. 9 all edge areas 16a, 16b and 16c are galvanically coupled to all zones 10a, 10b and 10c. Alternatively, however, it can also be provided to galvanically connect the respective edge areas 16a, 16b and/or 16c only to a partial quantity of the zones 10a, 10b and 10c. For example, it can be provided that the left-hand edge area 16c is electrically connected exclusively to the zone 10c via a conductive trace 14 and has no galvanic coupling to the zone 10a and 10b. It can then furthermore be provided that the zones 10a and 10b are galvanically coupled to each other via a connecting line 12 and in addition coupled to the lower edge area 16b as well as the right-hand edge area 16a. If a user holds the multilayer body 300 only in the left-hand edge area 16a, exclusively a first information area, formed by the zone 10c, is capacitively active. However, if he holds the multilayer body 300 only in the lower edge area 16b and/or right-hand edge area 16a, only a second information area, formed by the zones 10a and 10b, is active. In this way, a multilayer body 300 can be provided which provides a different item of information by means of the respectively active information areas, depending on which edge area it is held in by the user.

As a modification of the embodiment example according to FIG. 9 it can be provided that all first zones are formed rectangular, preferably square. Here, it is particularly preferred if the edges of the rectangle or square run parallel or perpendicular to the direction of extension of the edge areas 16a, 16b, 16c, which is in particular identical to the running direction of the respective marginal edge. It is then possible to align the multilayer body (located on an object such as for instance a card) corresponding to a reader. This applies in particular when this is a reader with a touch panel functionality, which has so-called sensor cells which are, for their part, rectangular or square. If the reader is established beforehand, the shape of the first zones 10 can be selected to match the sensor cells themselves.

Furthermore it is particularly preferred if the supply lines 12 represented in FIG. 9 are dispensed with and only the supply lines 14 are present. Each of the zones 10a, 10b and 10c is then galvanically connected to precisely one edge area, namely the edge areas 16a and 16b and 16c respectively. It then proves to be advantageous for all supply lines 14 to run at right angles to the direction of extension of the associated edge areas 16.

Figure 10:
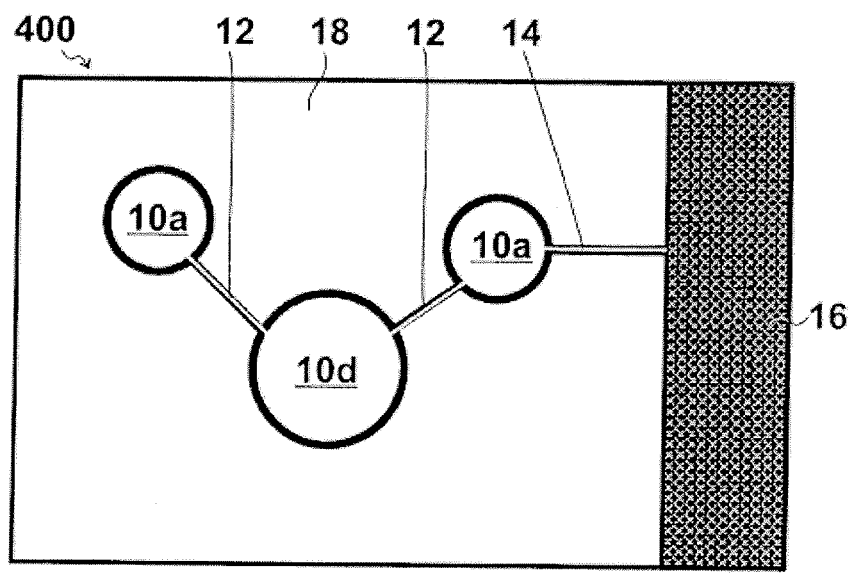
FIG. 10 shows a modification of the third embodiment of the multilayer body according to the invention in top view, which forms a security element

In the same way, FIG. 10 shows, in a multilayer body 400, a plurality of first zones 10a in a circular shape with a first size and 10d with a second size, which are connected to each other by connecting lines 12 and are connected to an edge area 16 via a connecting line 14. In the present case, in particular, a mixed design of the two embodiments according to FIGS. 1 to 4b on the one hand and FIGS. 5 to 8 on the other hand is involved: whereas the larger proportion of the multilayer body 400 shown in FIG. 10 is formed reflective, and therefore is formed as explained with reference to FIGS. 5 to 8, the edge area 16 is formed transparent and has the properties as explained above with reference to FIGS. 4a/b.

The multilayer body 400 from FIG. 10 can in particular be formed strip-shaped and can be arranged as a security strip on a value document such as for instance a banknote 1000 (see FIG. 11a), a travel ticket, a ticket or an admission ticket. The encoding provided by the first zones 10a and 10d can be read by positioning the banknote 1000 on a reader 2000, in the present case shown in the form of a smartphone. Here, a user grasps the banknote firmly at the edge area 16, which does not itself rest on the measuring fields of the touch panel of the smartphone. Only the first zones 10a and 10d lie on the touch panel. In the smartphone 2000 an application program (applet) is capable of detecting a capacitive interaction between the first zones 10a, 10d and the measuring fields, with the result that the effect is achieved as if there had been a touch on corresponding partial surfaces by a user's finger. In the same way as an item of information can be input by touching particular surfaces, in the present case an item of information thus becomes readable by the positioning of the banknote 1000.

The embodiment of FIG. 10 shows three zones 10 which are galvanically connected to the edge area 16 via partially diagonally running supply lines 12. According to the above statements, an analogous embodiment is particularly preferred here in which only two zones, e.g. the zones 10a and 10d, are present, and are connected to each other via a supply line 12 such that this supply line 12 runs perpendicular or parallel to the direction of extension of the edge area 16. This supply line 12 and the supply line 14 preferably have a width of at most 1 mm. The zones 10a and 10d are then furthermore preferably spaced apart from each other by at least 4 mm. In the case of the represented circular shape of the zones 10a and 10d, these then preferably have in each case a diameter of at least 5 mm, with the result that the distance between the zones 10a and 10d—now relative to the center of their circle—is at least 9 mm.

The circular shape of the first zones for instance according to FIG. 10 has the advantage that the multilayer body with such circular first zones 10 can be at any angle to a reader and does not have to be aligned with its sensor cells. However, it may then be necessary to accept smaller signal levels.

In the case of the banknote 1000 the multilayer body 400 in the form of a film element fulfils two main functions:
a) the capacitively encoded item of information can comprise, for example, the denomination of the banknote, the date of issue or the country of issue; and
b) it is indicated, by means of the authentication, that the security element is present and authentic. These functions are particularly useful for blind and visually impaired people, as they allow them, in everyday life, to identify paper money and check its authenticity.

In particular in the embodiment according to FIG. 5 to FIG. 8 there are larger metallic surfaces which can be provided with a surface relief structure by which in particular an optically variable device can be provided. Such an optically variable device shows a second item of visual information which can supplement the item of information provided or encoded by the first zones. Thus, for example, in the banknote 1000 from FIG. 11a an optically variable device can be provided on the multilayer body 400 which shows a number as the image, wherein the encoded item of information is likewise reproduced by the application program as a number. If the displayed number and the output number correspond, then it is possible to be sure that there is no forgery of the banknote 1000. Instead of a number, graphic motifs or graphic motif parts, individual word elements, whole words, sentence parts or whole sentences can also be reproduced. The first and second items of information also need not necessarily correspond, but can also supplement each other. Thus, for example, it can be the case that the application program has the effect that, when the banknote 1000 with the multilayer body 400 is positioned on the smartphone 2000, a particular internet address is called up, on which the image is recorded which also shows the optically variable device. In this way, a particularly high level of protection against forgery can be ensured.

Figure 12:
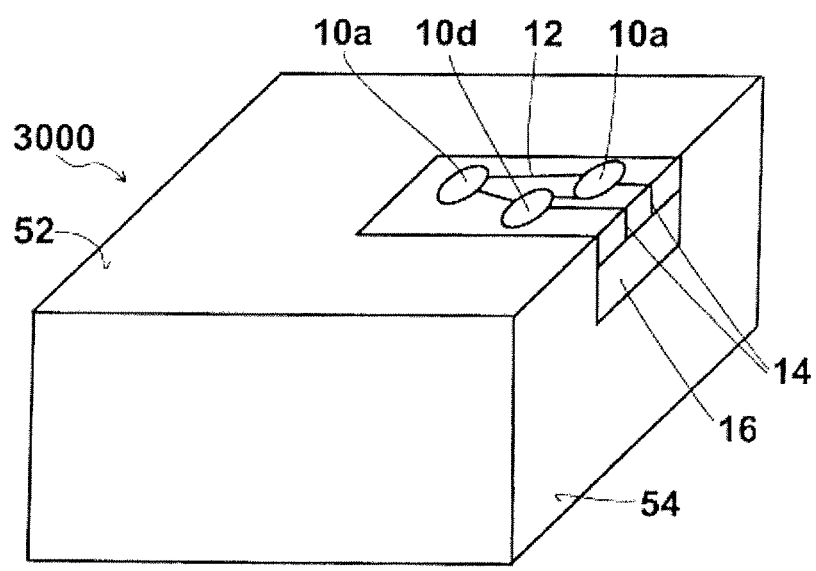

In the packaging 3000 shown in FIG. 12, which serves for instance to hold valuable medicaments or other pharmaceutical products, or also tobacco products, the multilayer body 400 from FIG. 10 is affixed over a corner. It is thereby possible to position a smartphone, not shown in FIG. 12, on the top side 52 of the packaging 3000, where the first zones 10a and 10d are provided. In the meantime, the user can touch the edge area 16 against the side wall 54 and thereby ground the first zones 10a and second zones 10d (and thus the information area as a whole).

Figure 11A:
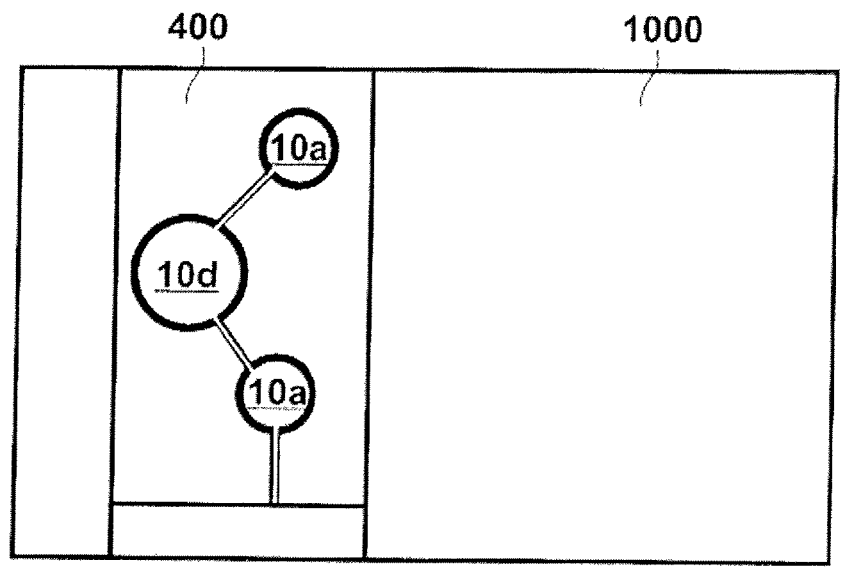
FIG. 11a shows a banknote with the security element according to FIG. 10 in top view
Figure 11B:
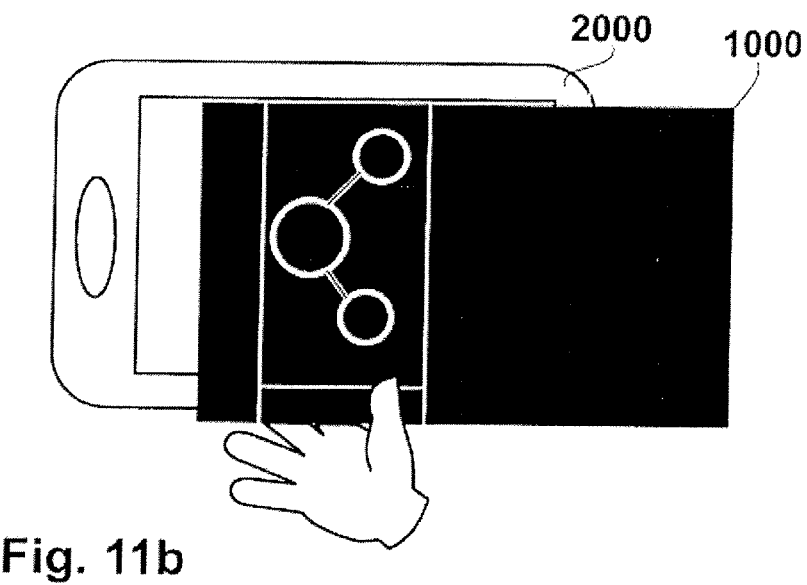
FIG. 11b illustrates how a code contained in the banknote according to FIG. 11a can be read with the aid of a reader and FIG. 12 shows a packaging with the security element according to FIG. 10 in perspective view.

As already stated with regard to FIG. 11b, the multilayer body 400 can encode items of information, for instance an item of information corresponding to a barcode (for product identification), a production date and/or an expiration date. In addition to this function of providing the encoded item of information, it is additionally also indicated by means of the authentication that a security element (as which the multilayer body 400 is formed) is present and authentic. Here too, again, the two functions are very useful for blind and visually impaired people, in order to check the authenticity of the packaging and thus also the goods contained therein.

For people who can see sufficiently well, an application program can also be provided here, again, in a smartphone, which guides the user to an Internet address or a program, by which a further item of information about the goods located in the packaging is given. Here too, the item of information can relate to optical security elements, in particular an optically variable device, on the multilayer body 400.

While it is represented in FIG. 12 that the multilayer body 400 is glued over a corner, other types of application are also possible, for instance application to a flat surface, application to a curved surface and application over two over more corners.

The invention claimed is:

1. A multilayer body with a carrier and a layer arranged thereon which comprises electrically conductive material in such an arrangement that
at least one information area and at least one background area are provided, wherein the at least one information area and the at least one background area are galvanically separated from each other,
wherein
in each information area a first zone with electrically conductive material is provided, over the entirety of which electrically conductive material is conductively connected to it, and wherein
in each background area a plurality of second zones with electrically conductive material is provided, wherein the second zones are galvanically separated from each other, and
wherein the electrically conductive material is provided with an average surface coverage which varies over all information areas and background areas by less than 25%, wherein the average surface coverage is calculated on partial surfaces which in each case have the same predetermined size, which is either 500 µm by 500 µm or 300 µm by 300 µm or 250 µm by 250 µm or 200 µm by 200 µm or 150 µm by 150 µm or 100 µm by 100 µm, whereby the information area and the background area appear visually similar.

2. A multilayer body according to claim 1, wherein at least one first zone occupies a surface area that is at least two times larger than each of the second zones.

3. A multilayer body according to claim 1, wherein, in at least a part of the first zones made of the electrically conductive material, a plurality of conductive traces are formed which have a width from the range of from 1 µm to 40 µm, and which are arranged in patterns.

4. A multilayer body according to claim 1, wherein at least one of the second zones is covered over the whole surface with electrically conductive material.

5. A multilayer body according to claim 4, wherein one or more of the first zones are covered over the whole surface with electrically conductive material, with the result that a closed area is provided.

6. A multilayer body according to claim 4, wherein at least one of the first zones comprises a partial area, covered over the whole surface with electrically conductive material, which are galvanically coupled to each other via conductive bars.

7. A multilayer body according to claim 4, further comprising a color layer or effect layer provided over and/or under the electrically conductive material, such that in combination with the electrically conductive material a characteristic motif results.

8. A multilayer body according to claim 1, further comprising an additional non-conductive reflective layer over the whole surface, wherein this additional reflective layer is formed from HRI materials.

9. A multilayer body according to claim 1, wherein a background area completely surrounds all information areas.

10. A multilayer body according to claim 1, comprising only one information area.

11. A multilayer body according to claim 1, wherein an information area comprises a plurality of first zones which are galvanically coupled to each other by at least one conductive trace.

12. A multilayer body according to claim 1, wherein, as electrically conductive material, at least one material is selected from the group of silver, copper, gold, aluminum, chromium, mixtures and/or alloys of the above-named materials, an electrically conductive paste, polyaniline and polythiophene.

13. A multilayer body according to claim 1, further comprising a transparent dielectric layer on the layer with the electrically conductive material.

14. A multilayer body according to claim 1, wherein at least one first zone has a dimension in a direction of extension of between 2.5 mm and 15 mm.

15. A packaging or packaged product, banknote, check, credit card, identification document, travel or admission ticket, tag, playing card, or security element for identifying a product with a brand name, with a multilayer body according to claim 1.

16. A banknote with a substrate and a strip-shaped multilayer body according to claim 1 which is applied to the substrate as a security element or is embedded in the substrate as a security thread.

17. A pharmaceutical product or cigarettes, or packaged product, wherein the packaging or the packaged product comprises a multilayer body according to claim 1, which is applied to a surface.

18. A multilayer body according to claim 1, wherein the electrically conductive material further simultaneously provides a further functionality as a reflective layer for optical security features.

19. A multilayer body according to claim 18, wherein the optically variable device is selected from the group consisting of a linear or crossed sinusoidal or rectangular diffraction grating, a zero-order diffraction structure, a 2D/3D or 3D hologram, a Kinegram®, a Trustseal®, a colored or achromatic blazed grating, an isotropic or anisotropic mat structure, a microlens structure, a macrostructure, and a thin film color-change system.

20. A multilayer body according to claim 19, wherein a first item of information is encoded by the position, size, alignment and/or shape of all first zones and/or the distance of several first zones from each other, and wherein a second item of visual information provided by the optical security feature partially or completely corresponds to the first item of information or supplements this first item of information to form a total item of information.

21. A multilayer body with a carrier and a layer arranged thereon which comprises electrically conductive material in such an arrangement that at least one information area and at least one background area are provided, wherein the at least one information area and the at least one background area are galvanically separated from each other, and
wherein, in each information area, a first zone with electrically conductive material is provided, over the entirety of which electrically conductive material is conductively connected to it, and
wherein, in each background area a plurality of second zones with electrically conductive material is provided, wherein the second zones are galvanically separated from each other, and
wherein, in at least a part of the first zones made of the electrically conductive material, a plurality of conductive traces are formed which have a width from the range of from 1 µm to 40 µm, and which are arranged in patterns, and wherein, in at least two of the second zones made of the electrically conductive material, conductive trace parts are formed which have a width from the range of from 1 µm to 40 µm, and which are galvanically separated from conductive trace parts of another of the second zones via a gap with a length which is between 50% and 200% of the width of the conductive trace parts.

22. A multilayer body according to claim 21, wherein the electrically conductive material is provided with an average surface coverage which varies over all information areas and background areas by less than 25%, wherein the average surface coverage is calculated on partial surfaces which in each case have the same predetermined size, which is either 500 µm by 500 µm or 300 µm by 300 µm or 250 µm by 250 µm or 200 µm by 200 µm or 150 µm by 150 µm or 100 µm by 100 µm.

23. A multilayer body according to claim 21, wherein the conductive traces from each information area have the same first width and the conductive trace parts from each background area have the same second width, wherein the first and second widths only differ from each other by at most 30% of the respectively larger value.

24. A multilayer body according to claim 21, wherein at least in some of the second zones two conductive trace parts overlap.

25. A multilayer body with a carrier and a layer arranged thereon which comprises electrically conductive material in such an arrangement that at least one information area and at least one background area are provided, wherein the at least one information area and the at least one background area are galvanically separated from each other, and wherein, in each information area, a first zone with electrically conductive material is provided, over the entirety of which electrically conductive material is conductively connected to it, and wherein, in each background area a plurality of second zones with electrically conductive material is provided, wherein the second zones are galvanically separated from each other, and wherein, in at least a part of the first zones made of the electrically conductive material, a plurality of conductive traces are formed which have a width from the range of from 1 µm to 40 µm, and which are arranged in patterns, and wherein conductive traces of an information area are in each case allocated a conductive trace part of a background area, from which they are separated via a gap with a width which lies between half of and ten times the width of the conductive traces.

26. A multilayer body with a carrier and a layer arranged thereon which comprises electrically conductive material in such an arrangement that at least one information area and at least one background area are provided, wherein the at least one information area and the at least one background area are galvanically separated from each other, and wherein, in each information area, a first zone with electrically conductive material is provided, over the entirety of which electrically conductive material is conductively connected to it, and wherein, in each background area a plurality of second zones with electrically conductive material is provided, wherein the second zones are galvanically separated from each other, and wherein two-dimensional, linear and/or punctiform areas without conductive material are formed according to a first pattern in at least one information area and two-dimensional, linear and/or punctiform areas without conductive material are formed according to a second pattern different from the first pattern in at least one background area, wherein the first and/or second pattern is formed by a statistical distribution of small, transparent and non-conductive punctiform area.

27. A multilayer body with a carrier and a layer arranged thereon which comprises electrically conductive material in such an arrangement that at least one information area and at least one background area are provided, wherein the at least one information area and the at least one background area are galvanically separated from each other, and wherein, in each information area, a first zone with electrically conductive material is provided, over the entirety of which electrically conductive material is conductively connected to it, wherein, in each background area a plurality of second zones with electrically conductive material is provided, wherein the second zones are galvanically separated from each other, and wherein at least one of the second zones is covered over the whole surface with electrically conductive material, and wherein the at least one second zone covered over the whole surface with electrically conductive material is separated from a first zone covered over the whole surface with electrically conductive material or a partial area of the first zone via a gap which is not wider than 150 µm.

28. A multilayer body with a carrier and a layer of electrically conductive material arranged on the carrier, the layer of electrically conductive material comprising:

at least one information area comprising a first zone, the first zone having electrically conductive material conductively connected over the entirety of the first zone; and at least one background area galvanically separated from the at least one information area, the at least one background area comprising a plurality of second zones with electrically conductive material, the second zones being galvanically separated from each other, wherein the electrically conductive material further provides a function of an optical security feature, whereby the multilayer body further comprises an optically variable device.

\* \* \* \* \*